UNITED STATES PATENT OFFICE.

ARNOLD SCHEDLER, OF MANCHESTER, ENGLAND, ASSIGNOR TO SOCIETY OF CHEMICAL INDUSTRY IN BASLE, OF BASEL, SWITZERLAND.

DYESTUFFS CAPABLE OF BEING DIAZOTIZED AND PROCESS OF MAKING SAME.

1,342,134.     Specification of Letters Patent.     Patented June 1, 1920.

No Drawing.     Application filed December 27, 1919. Serial No. 347,834.

*To all whom it may concern:*

Be it known that I, ARNOLD SCHEDLER, a citizen of the Swiss Republic, and resident of Manchester, Great Britain, have invented new Dyestuffs Capable of Being Diazotized and Processes of Making Same, of which the following is a full, clear, and exact specification.

I have found that valuable dyestuffs able to be diazotized are obtained by combining one molecule of the tetrazoderivatives of 3.3'-diaminodiarylmethanes in an alkaline medium with 2 molecules of 2-amino-5-oxynaphthalene-7-sulfonic compounds containing a free, further diazotizable amino group, as, for instance, the 2-amino-5-oxynaphthalene-7-sulfonic acid, the 2-amino-5-oxynaphthalene-1.7-disulfonic acid or such derivatives of 2-amino-5-oxynaphthalene-7-sulfonic acid which contain diazotizable amino groups in heteronuclear lateral chains.

These dyestuffs can be prepared by combining 1 molecule of the tetrazoderivative with two molecules of the same 2-amino-5-oxynaphthalene-7-sulfonic compound or with two different molecules of the specified 2-amino-5-oxynaphthalene-7-sulfonic compounds.

The new dyestuffs constitute in a dry state red-brown to dark-brown powders and dissolve in water with orange to blue-red colorations and in concentrated sulfuric acid with red to violet-blue colorations. They are further characterized by the extraordinary fastness of their dyeings diazotized on the fiber and subsequently developed with a non-sulfonated developing compound, as for instance betanaphthol, and by the purity of the thus obtained yellow-red to blue-violet tints. They can further be utilized as parent materials for the manufacture of other dyestuffs.

According to the present invention can be employed as 3.3'-diaminodiarylmethanes for instance the 3.3'-diaminodiphenylmethane, the 3.3'-diamino-4.4'-dimethyldiphenylmethane, the 3.3'-diamino-4.4'.6.6'-tetramethyldiphenylmethane, the ether of the 3.3'-diamino-4.4'-dioxydiphenylmethane etc. and as 2-amino-5-oxynaphthalene-7-sulfonic compounds, can also be employed, for instance those corresponding to the following formulas:

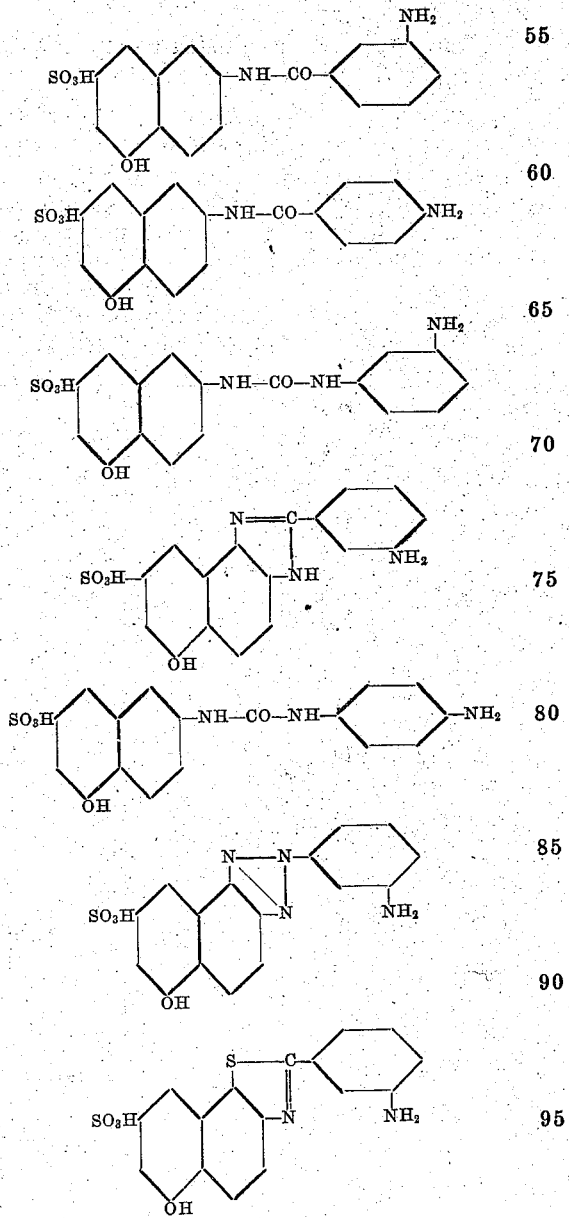

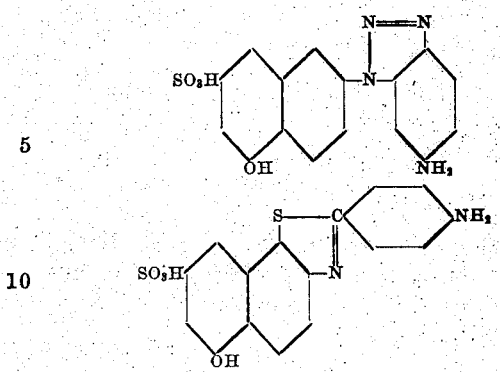

The invention is illustrated by the following example:

*Example.*

21.2 kg. of 3.3′-diamino-4.4′-dimethyldiphenylmethane are diazotized with 60 kg. of hydrochloric acid of 30 per cent. and 13.8 kg. of sodium nitrite of 100 per cent. at 0° C. The solution of the resulting tetrazoderivative is poured into a solution of 72 kg. m-amino-benzoyl-2-amino-5-oxynaphthalene-7-sulfonic acid and of 60 kg. of sodium carbonate. The dyestuff is isolated by boiling and adding common salt. It constitutes a dark-red powder soluble in water to yellow red colorations and in concentrated sulfuric acid to red solution. It dyes unmordanted cotton red tints which become faster to washing and somewhat yellower when diazotized on the fiber and developed on the same with betanaphthol.

In this example can be substituted for the 3.3′-diamino-4.4′-dimethyldiphenylmethane an equivalent quantity of any other 3.3′-diaminodiarylmethane, while the m-aminobenzoyl-2-amino-5-oxynaphthalene-7-sulfonic acid can be replaced by an equivalent quantity of any other of the specified 2-amino-5-oxynaphthalene-7-sulfonic compounds.

In the following tabular exhibit are shown the tints of the direct dyeings and of the diazotized dyeings developed with betanaphthol obtained with a certain number of dyestuffs capable of being prepared according to the present invention.

| The tetrazoderivative of— | Combined with— | Gives a dyestuff dyeing cotton— | |
| --- | --- | --- | --- |
|  |  | Directly— | After diazotizing and development with betanaphthol— |
| 3.3′-Diaminodiphenylmethane. | 2 molecules [structure: SO₃H, OH naphthalene with NH—CO—C₆H₄—NH₂] | Yellow red. | Yellow red. |
| Id. | 2 molecules [structure: SO₃H, OH naphthalene with N=C—C₆H₄—NH₂, NH] | Red. | Red. |
| Id. | 2 molecules [structure: SO₃H, OH naphthalene with NH₂] | Orange. | Violet. |

| The tetrazoderivative of— | Combined with— | Gives a dyestuff dyeing cotton— | |
|---|---|---|---|
| | | Directly— | After diazotizing and development with beta-naphthol— |
| 3.3′-Diaminodiphenylmethane. | 2 molecules 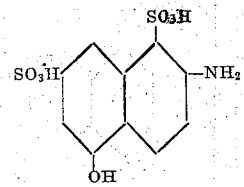 | Orange. | Red-violet. |
| 3.3′-Diamino-4.4′-dimethyldiphenylmethane. | 2 molecules 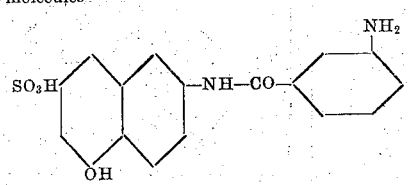 | Red. | Yellow-red. |
| Id. | 2 molecules 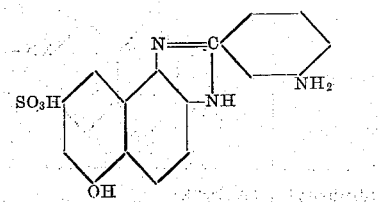 | Blue-red. | Blue-red. |
| 3.3′-Diamino-4.4′-dimethyldiphenylmethane. | 2 molecules 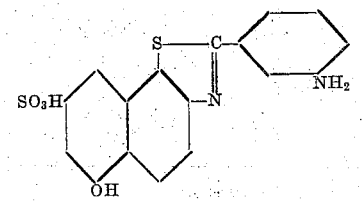 | Blue-red. | Blue-red. |
| Id. | 2 molecules 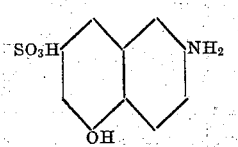 | Yellow-red. | Violet. |
| Id. | 2 molecules 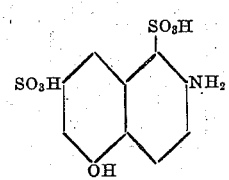 | Orange. | Violet. |

| The tetrazoderivative of— | Combined with— | Gives a dyestuff dyeing cotton— | |
|---|---|---|---|
| | | Directly— | After diazotizing and development with beta-naphthol— |
| 3.3′-Diamino-4.4′-dimethyldiphenylmethane. | 1 molecule 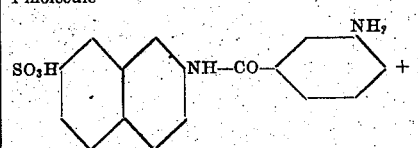 + 1 molecule 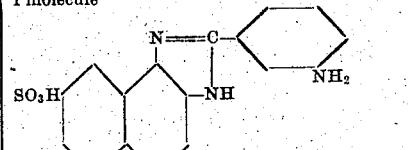 | Red. | Red. |
| 3.3′-Diamino-4.4′.6.6′-tetramethyldiphenylmethane. | 2 molecules 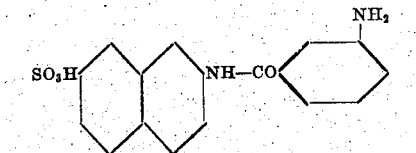 | Red. | Red. |
| 3.3′-Diamino-4.4′.6.6′-tetramethyldiphenylmethane. | 2 molecules 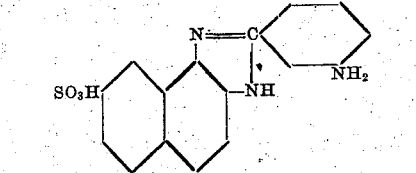 | Blue-red. | Blue-red. |
| Id. | 2 molecules 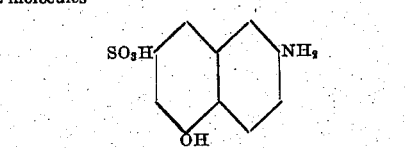 | Red. | Blue-violet. |
| 3′.3′-Diamino-4.4′-dimethoxydiphenylmethane. | 2 molecules 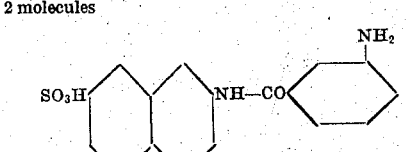 | Blue-red. | Blue-red. |

| The tetrazoderivative of— | Combined with— | Gives a dyestuff dyeing cotton— | |
|---|---|---|---|
| | | Directly— | After diazotizing and development with beta-naphthol— |
| 3.3'-Diamino-4.4'-dimethoxydiphenylmethane. | 2 molecules 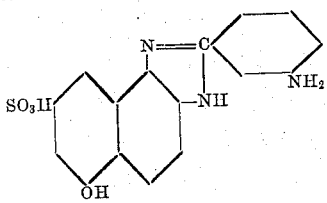 | Blue-red. | Blue-red. |
| Id. | 2 molecules 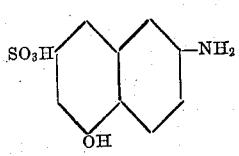 | Red. | Blue-violet. |

What I claim is:

1. The herein described process for the manufacture of dyestuffs able to be diazotized consisting in diazotizing a 3.3'-diaminodiarylmethane and combining one molecule of the resulting tetrazoderivative in an alkaline medium with 2 molecules of 2-amino-5-oxynaphthalene-7-sulfonic compounds containing a free further diazotizable amino group.

2. The herein described process for the manufacture of dyestuffs able to be diazotized, consisting in diazotizing the 3.3'-diamino-4.4'-dimethyldiphenylmethane and combining one molecule of the resulting tetrazoderivative in an alkaline medium with two molecules of 2-amino-5-oxynaphthalene-7-sulfonic compounds containing a free further diazotizable amino group.

3. As new products the herein described dyestuffs able to be diazotized, derived from 3.3'-tetrazo-diarylmethanes and 2-amino-5-oxynaphthalene-7-sulfonic compounds, which constitute in a dry state red-brown to dark-brown powders, dissolve in water with orange to blue red, and in concentrated sulfuric acid with red to violet-blue colorations, and dye cotton directly orange to blue-red tints becoming fast to washing, when diazotized on the fiber and subsequently developed with a non-sulfonated developing compound.

4. As new products the herein described dyestuffs able to be diazotized, derived from 3.3'-tetrazo-4.4'-dimethyldiphenylmethane, and 2-amino-5-oxynaphthalene-7-sulfonic compounds, which constitute in a dry state red-brown to dark-brown powders, dissolve in water with orange to blue-red, and in concentrated sulfuric acid with red to violet-blue colorations and dye cotton directly orange to blue-red tints becoming extraordinarily fast to washing, when diazotized on the fiber and subsequently developed with a non-sulfonated developing compound.

In witness whereof I have hereunto signed my name this 3rd day of December, 1919.

ARNOLD SCHEDLER.